(12) United States Patent
Devendran et al.

(10) Patent No.: US 10,520,045 B2
(45) Date of Patent: Dec. 31, 2019

(54) VEHICLE TRANSMISSION

(71) Applicant: FORD GLOBAL TECHNOLOGIES, LLC, Dearborn, MI (US)

(72) Inventors: Ram Sudarsan Devendran, Dearborn, MI (US); Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 15/883,983

(22) Filed: Jan. 30, 2018

(65) Prior Publication Data

US 2019/0234469 A1 Aug. 1, 2019

(51) Int. Cl.
| | |
|---|---|
| F16D 48/02 | (2006.01) |
| F16D 25/10 | (2006.01) |
| F16H 61/00 | (2006.01) |
| F16H 61/02 | (2006.01) |
| F16K 17/04 | (2006.01) |
| F16K 17/06 | (2006.01) |

(52) U.S. Cl.
CPC ............. *F16D 25/14* (2013.01); *F16D 25/10* (2013.01); *F16H 61/0021* (2013.01); *F16H 61/0276* (2013.01); *F16K 17/0406* (2013.01); *F16K 17/06* (2013.01); *F16H 2061/0279* (2013.01)

(58) Field of Classification Search
CPC ...... F16D 25/10; F16D 25/14; F16H 61/0021; F16H 61/0276; F16H 2061/0279; F16K 17/06; F16K 17/0406
See application file for complete search history.

(56) References Cited

U.S. PATENT DOCUMENTS

| | | | | |
|---|---|---|---|---|
| 3,537,557 | A | * | 11/1970 | Olson ................. F16D 25/0638 192/106 F |
| 3,762,520 | A | * | 10/1973 | Busch ................. F16D 25/0638 192/106 F |
| 3,872,956 | A | * | 3/1975 | Herr ......................... F16D 25/14 192/85.28 |
| 4,006,808 | A | | 2/1977 | Starling et al. |
| 4,090,414 | A | * | 5/1978 | White ................. F16H 61/0272 192/221 |
| 4,249,647 | A | * | 2/1981 | Snoy ....................... F16D 25/14 192/103 FA |
| 4,261,455 | A | | 4/1981 | Uitenbroek et al. |
| 4,399,900 | A | * | 8/1983 | Ballendux ............... F16D 25/14 192/106 F |
| 4,421,218 | A | | 12/1983 | Haight |
| 4,827,784 | A | * | 5/1989 | Muller .................... F16D 25/10 192/106 F |

(Continued)

*Primary Examiner* — Charles A Fox
*Assistant Examiner* — Tinh T Dang
(74) *Attorney, Agent, or Firm* — David Kelley; Brooks Kushman P.C.

(57) ABSTRACT

A vehicle transmission includes a plurality of clutches, a shaft, and a pressure relief valve. The plurality of clutches each define a balance dam chamber. The shaft partially defines a pressurized fluid circuit that includes each balance dam chamber. The shaft also defines an outlet. The pressure relief valve is disposed within the shaft between the pressurized fluid circuit and the outlet. The pressure relief valve is configured to open at a threshold pressure of the fluid circuit, wherein the threshold pressure decreases as rotational speed of the shaft increases.

20 Claims, 5 Drawing Sheets

(56) References Cited

U.S. PATENT DOCUMENTS

| | | | | |
|---|---|---|---|---|
| 4,934,218 A | * | 6/1990 | Takase | F16D 25/0638 |
| | | | | 192/106 F |
| 5,685,803 A | * | 11/1997 | Furukawa | F16H 61/061 |
| | | | | 477/156 |
| 5,725,013 A | * | 3/1998 | Premiski | F16D 25/14 |
| | | | | 137/454.2 |
| 5,810,142 A | | 9/1998 | Schaefer | |
| 5,967,285 A | * | 10/1999 | Mohan | F16D 25/0638 |
| | | | | 192/103 F |
| 6,374,687 B1 | * | 4/2002 | Tanizawa | F16H 61/04 |
| | | | | 192/48.614 |
| 6,533,095 B2 | * | 3/2003 | Mohan | F16D 25/0638 |
| | | | | 192/103 F |
| 8,327,988 B2 | | 12/2012 | Ogasawara | |
| 8,672,112 B2 | | 3/2014 | Ikeda et al. | |
| 9,273,789 B2 | | 3/2016 | Schmidt et al. | |
| 9,316,270 B2 | * | 4/2016 | Mitsubori | F16D 25/06 |

\* cited by examiner

VEHICLE TRANSMISSION

TECHNICAL FIELD

The present disclosure relates to vehicle transmissions.

BACKGROUND

Vehicle transmissions may include hydraulic systems that utilize pressurized hydraulic fluid to engage/disengage various clutches within the transmission in order to establish multiple gear ratios between an input and an output of the transmission.

SUMMARY

A vehicle transmission includes a plurality of clutches, a shaft, and a pressure relief valve. The plurality of clutches each define a balance dam chamber. The shaft partially defines a pressurized fluid circuit that includes each balance dam chamber. The shaft also defines an outlet. The pressure relief valve is disposed within the shaft between the pressurized fluid circuit and the outlet. The pressure relief valve is configured to open at a threshold pressure of the fluid circuit, wherein the threshold pressure decreases as rotational speed of the shaft increases.

A transmission includes a first clutch, a second clutch, a shaft, and a pressure relief valve. The first and second clutches each define a balance dam chamber. The shaft defines an axially extending pressurized fluid circuit that is open to each balance dam chamber. The shaft also defines an outlet channel extending radially outward from the fluid circuit. The pressure relief valve is disposed within the outlet channel and is configured to open at a threshold pressure of the fluid circuit, wherein the threshold pressure decreases as rotational speed of the shaft increases.

A transmission includes a plurality of clutches, a rotating element, and a pressure relief valve. The plurality of clutches each define a balance dam chamber. The rotating element defines a pressurized fluid circuit that is open to each balance dam chamber. The shaft also defines a non-pressurized outlet. The pressure relief valve is disposed between the pressurized fluid circuit and the non-pressurized outlet. The pressure relief valve is configured to open at a threshold pressure of the pressurized fluid circuit, wherein the threshold pressure decreases as rotational speed of the rotating element increases.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
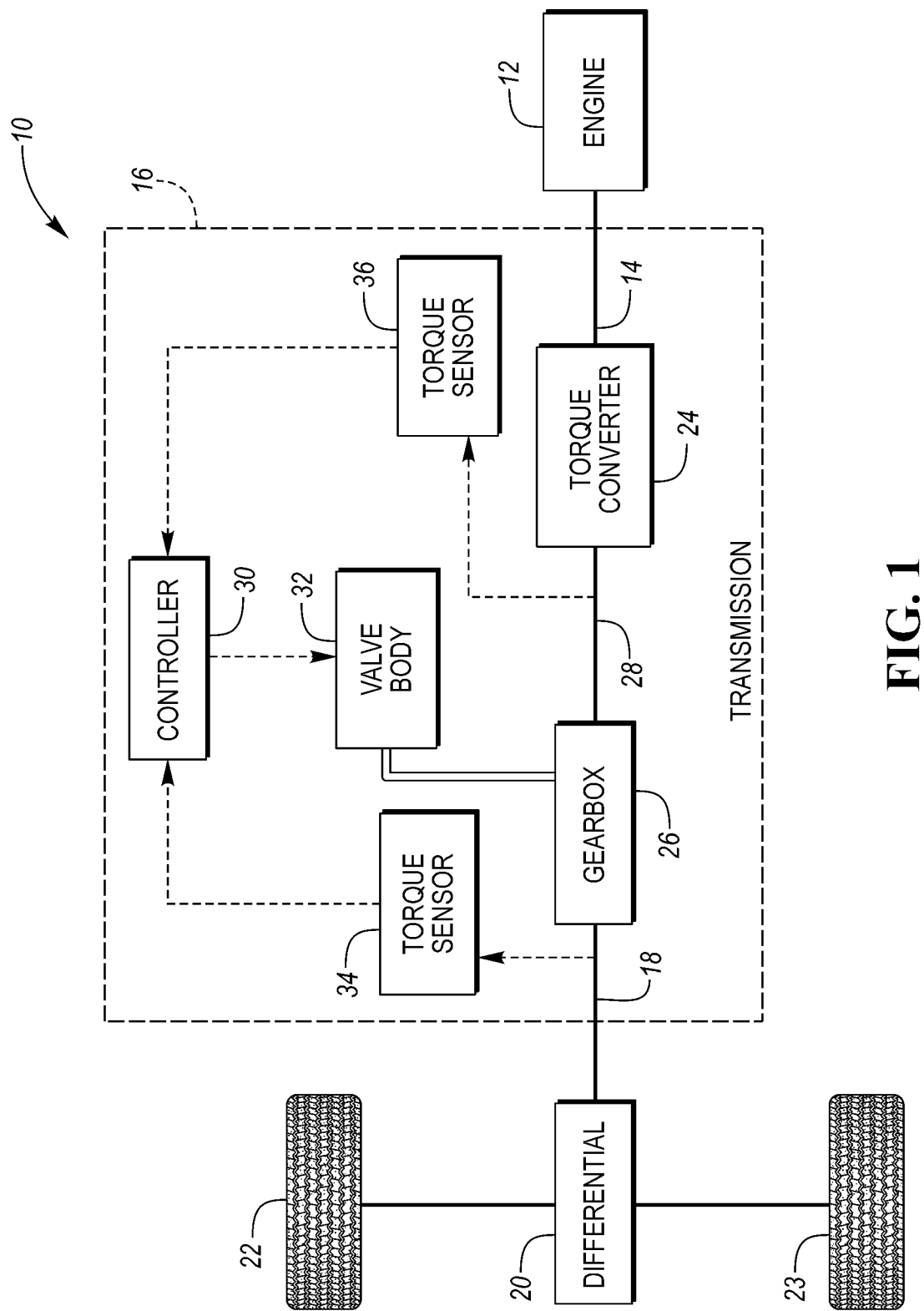
FIG. 1 is a schematic illustration of an exemplary vehicle and an exemplary vehicle powertrain.

A powertrain of a vehicle 10 is illustrated schematically in FIG. 1. Solid lines indicate mechanical connections. Broken lines represent the flow of signals. Double lines represent the flow of fluid. An engine 12 provides power to rotate a crankshaft 14. A transmission 16 transits the power from the crankshaft 14 to a driveshaft 18 while potentially modifying the speed and torque to be more suitable to the present vehicle requirements. A differential 20 distributes the power to a left wheel 22 and a right wheel 23 while permitting slight speed differences between the wheels such as when the vehicle 10 turns a corner.

The transmission includes a torque converter 24 and a gearbox 26. The torque converter 24 is a fluid coupling device that includes an impeller, stator, and turbine. The torque converter 24 transmits the power from the crankshaft 14 to a turbine shaft 28 (which may be referred to as an input shaft to the gearbox 26). The crankshaft 14 may be coupled to the impeller of the torque converter 24. The gearbox 26 transmits the power from the turbine shaft 28 to the driveshaft (or output shaft) 18. A controller 30 sends signals to a valve body 32 causing the valve body 32 to send pressurized fluid to clutches in the gearbox 26. The gear ratio of the gearbox 26 depends upon which subset of the clutches are provided with pressurized fluid. The controller 30 utilizes many inputs to determine what commands to send to valve body 32 including signals from an output torque sensor 34 and a turbine torque sensor 36. Additionally, the transmission 16 may include several speed sensors that may be utilized to determine the slip across all the internal clutches in the gearbox 26. The speed sensors may be located at the input of the transmission 16, at the output of the transmission 16, and at least two intermediate positions within the gearbox 26 of the transmission 16. The input of the transmission may refer to the crankshaft 14, the impeller of the torque converter 24, or the turbine (i.e., turbine shaft 28) of the torque converter 24. The output of the transmission 16 may refer to the driveshaft 18.

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions the vehicle 10 or vehicle subsystems. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the vehicle 10 or vehicle subsystems.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 30 may be configured to receive various states or conditions of the various vehicle components illustrated in FIG. 1 via electrical signals. The electrical signals may be delivered to the controller 30 from the various components via input channels. Additionally, the electrical signals received from the various components may be indicative of a request or a command to change or alter a state of one or more of the respective components of the vehicle 10. The controller 30 includes output channels that are configured to deliver requests or commands (via electrical signals) to the various vehicle components. The controller 30 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel out of one element may operate as an input channel to another element and vice versa.

Figure 2:
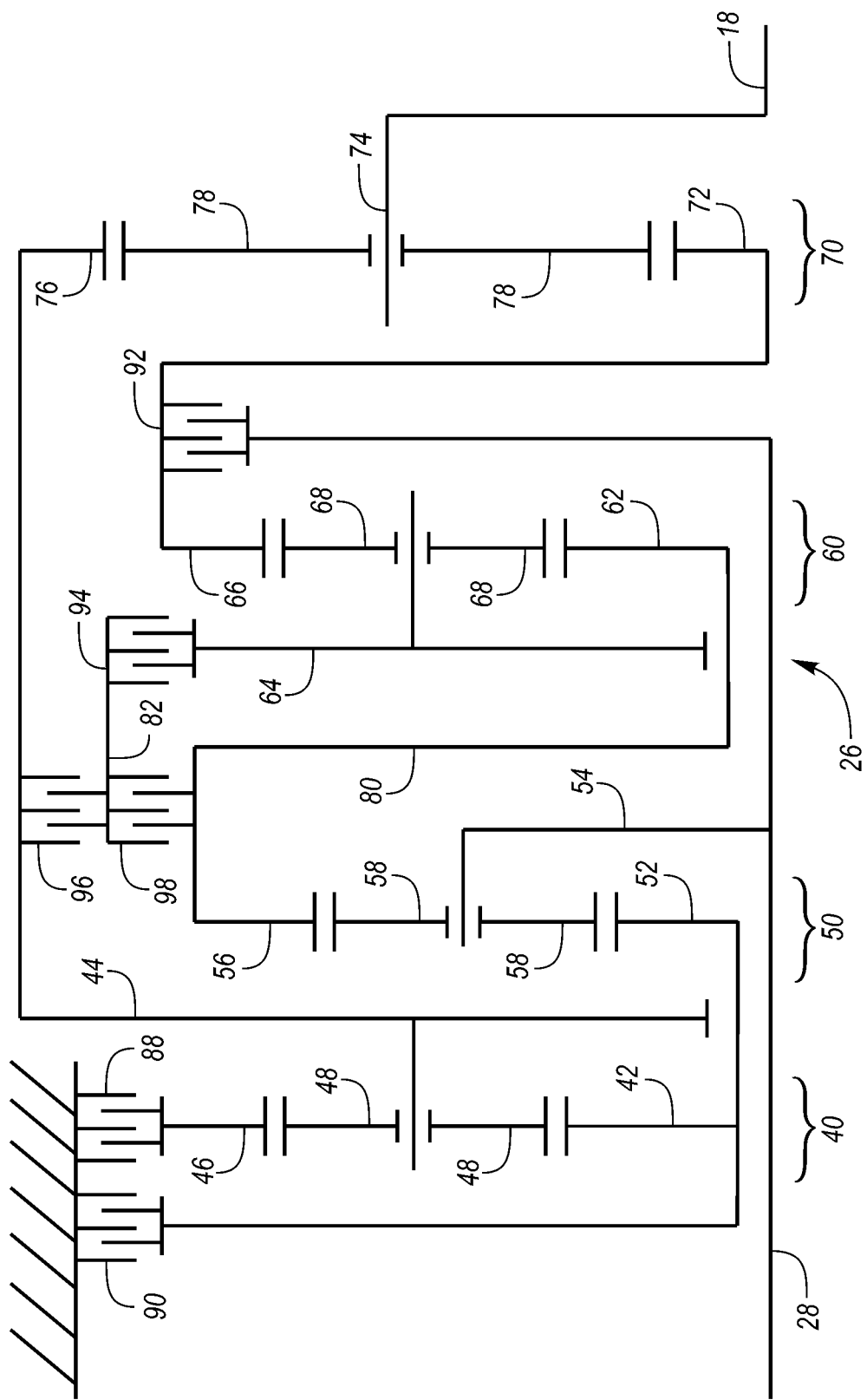
FIG. 2 is a schematic diagram of an exemplary transmission gearing arrangement.

An example gearbox is schematically illustrated in FIG. 2. The gearbox may also be referred to as a gearing arrangement. A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a fixed component, such as a transmission housing, may be called a brake.

It should be noted that the proposed method is applicable to a wide variety of gearbox arrangements and should not be limited to the gearbox in FIG. 2. The gearbox utilizes four simple planetary gear sets 40, 50, 60, and 70. Sun gear 42 is fixed to sun gear 52, carrier 44 is fixed to ring gear 76, ring gear 56 is fixed to sun gear 62 by shaft 80, ring gear 66 is fixed to sun gear 72, turbine shaft 28 is fixed to carrier 54, and driveshaft 18 is fixed to carrier 74. Ring gear 46 is selectively held against rotation by brake 88 and sun gears 42 and 52 are selectively held against rotation by brake 90. Turbine shaft 28 is selectively coupled to ring gear 66 and sun gear 72 by clutch 92. Intermediate element 82 (which may be a shaft) is selectively coupled to carrier 64 by clutch 94, selectively coupled to carrier 44 and ring gear 76 by clutch 96, and selectively coupled to shaft 80 by clutch 98.

As shown in Table 1, engaging the clutches and brakes in combinations of four establishes ten forward speed ratios and one reverse speed ratio between turbine shaft 28 and driveshaft 18. An X indicates that the corresponding clutch is engaged to establish the speed ratio.

TABLE 1

|  | 88 | 90 | 92 | 94 | 96 | 98 | Ratio | Step |
|---|---|---|---|---|---|---|---|---|
| Rev | X | X |  | X | X |  | -4.79 | 102% |
| 1st | X | X | X | X |  |  | 4.70 |  |
| 2nd | X | X |  | X |  | X | 2.99 | 1.57 |
| 3rd | X |  | X | X |  | X | 2.18 | 1.37 |
| 4th | X |  |  | X | X | X | 1.80 | 1.21 |
| 5th | X |  | X |  | X | X | 1.54 | 1.17 |
| 6th | X |  | X | X | X |  | 1.29 | 1.19 |
| 7th |  |  | X | X | X | X | 1.00 | 1.29 |
| 8th |  | X | X | X |  | X | 0.85 | 1.17 |

TABLE 1-continued

|   | 88 | 90 | 92 | 94 | 96 | 98 | Ratio | Step |
|---|----|----|----|----|----|----|-------|------|
| 9$^{th}$  |   | X | X |   | X | X | 0.69 | 1.24 |
| 10$^{th}$ |   | X |   | X | X | X | 0.64 | 1.08 |

All single step and two step shifts are performed by gradually engaging one clutch, called an oncoming element, while gradually releasing a different clutch, called the off-going element. During each of these shifts, three clutches, called holding elements, are maintained fully engaged while one element is maintained fully disengaged. In other gearbox arrangements, the number of holding elements may be different.

It should be understood that the transmission configuration described herein is merely exemplary and is not intended to be limited. Other transmission configurations should be construed as disclosure herein. Other transmission configurations may include manual transmissions, transmission that include a launch clutch as opposed to a torque converter, dual input clutch transmissions, etc.

Figure 3:
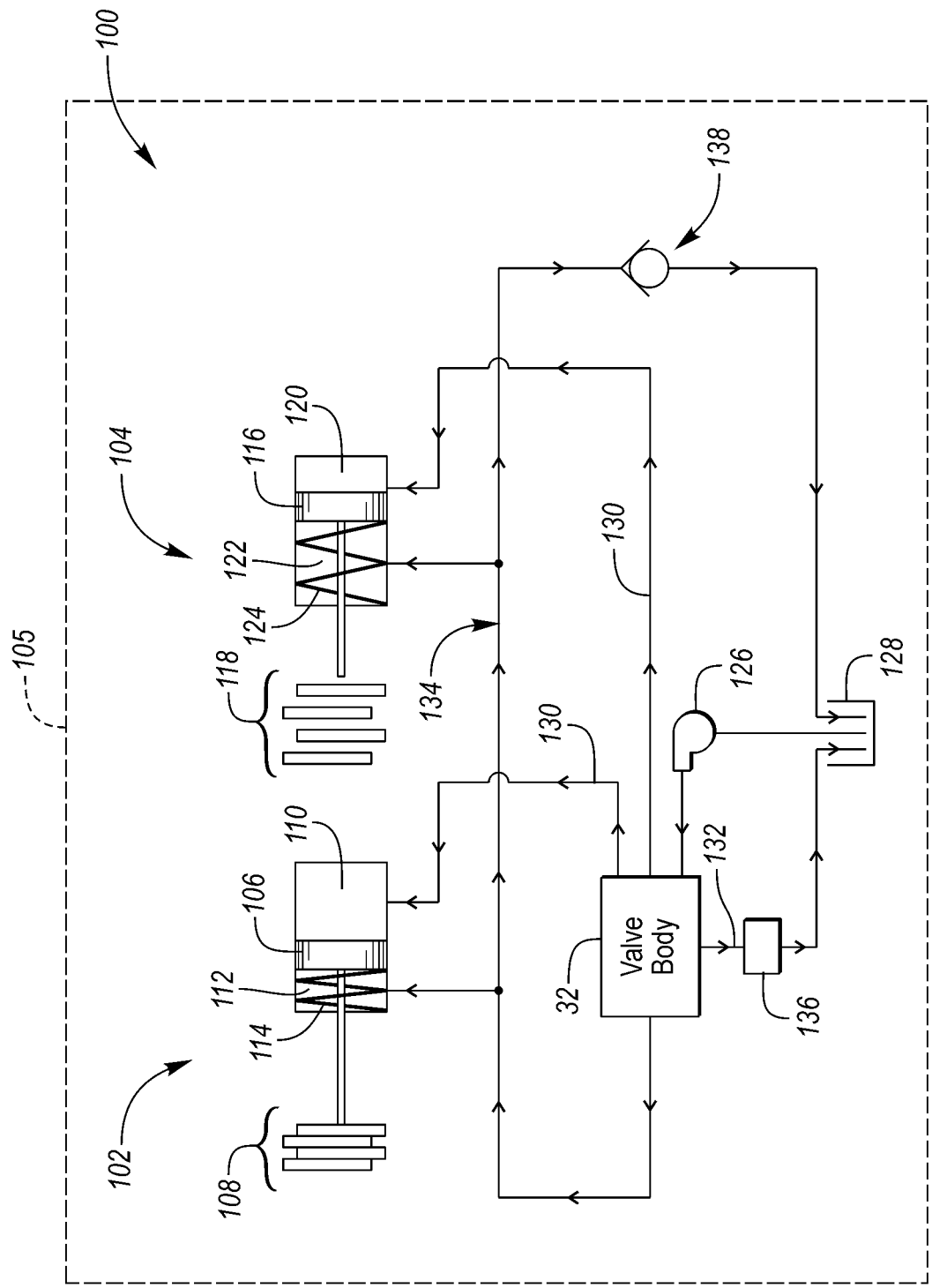
FIG. 3 is a schematic diagram of a transmission hydraulic system.

Referring to FIG. 3, a schematic diagram of a transmission hydraulic system 100 is illustrated. The hydraulic system 100 may be the hydraulic system (or a portion thereof) utilized in the transmission 16 depicted in FIG. 1 or in any other transmission device that utilized hydraulics to engage/disengage clutches to establish multiple gear ratios between an input and an output of the transmission. FIG. 3 depicts a first clutch 102 and a second clutch 104. However, it should be understood that the hydraulic system 100 includes at least two (or a plurality) of clutches. For example, the hydraulic system 100 may include all of the clutches and brakes depicted in FIG. 2. The hydraulic system 100, including the first clutch 102 and second clutch 104, may be disposed within a housing 105 of the transmission 16.

The first clutch 102 may include a first piston 106 and first clutch pack 108. The first clutch 102 may define a first chamber 110 on an apply side of the first piston 106 and a first balance dam chamber 112 on an opposing side of the first piston 106 relative to the first chamber 110. The first piston 106 is configured to engage and disengage the first clutch pack 108 in order to couple and decouple a first rotating element to and from a second rotating element. The first rotating element and the second rotating element may each be a shaft, gear, drum, or any other rotating element within a transmission. For example, the first rotating element and the second rotating element may be any of the gears or shafts depicted within the gearbox 26 in FIG. 2. The first clutch 102 also includes a first return spring 114 that is configured to retract the first piston 102 when the first chamber 110 is depressurized in order to disengage the first clutch 102.

The second clutch 104 may include a second piston 116 and second clutch pack 118. The second clutch 104 may define a second chamber 120 on an apply side of the second piston 116 and a second balance dam chamber 122 on an opposing side of the second piston 116 relative to the second chamber 120. The second piston 116 is configured to engage and disengage the second clutch pack 118 in order to couple and decouple a third rotating element to and from a fourth rotating element. The third rotating element and the fourth rotating element may each be a shaft, gear, drum, or any other rotating element within a transmission. For example, the third rotating element and the fourth rotating element may be any of the gears or shafts depicted within the gearbox 26 in FIG. 2. The second clutch 104 includes a second return spring 124 that is configured to retract the second piston 104 when the second chamber 120 is depressurized in order to disengage the second clutch 104.

A balance dam creates a centrifugal hydraulic pressure that opposes and balances centrifugal hydraulic pressure (or force) that acts upon the pistons (e.g., first piston 106 and second piston 116) of a clutch. The centrifugal hydraulic pressure acting on the pistons is developed in the chambers on the apply side of the clutch pistons (e.g., first chamber 110 and second chamber 120). These centrifugal pressures are caused by rotation of the components of the within the clutches (e.g., first clutch pack 108, second clutch pack 118, first piston 106, second piston 116, etc.). Directing hydraulic fluid into the balance dam chambers eliminates or reduces the pressure (or forces) acting upon the pistons, which is caused by the speed of rotation, so that the control system pressure (i.e., the hydraulic pressure commanded to the chambers on the apply side of the clutch pistons) alone creates the necessary force for the first pistons to engage the clutch packs. For example, directing hydraulic fluid into the balance dam chambers improves the ability to control the clutches (by opposing and balancing the centrifugal hydraulic pressure that acts upon the pistons which may otherwise lead to errors in determining the torque capacity of the clutches when engaged if not balanced by the hydraulic fluid in the balance dam chambers) and keeps the clutch from drifting to an engaged position (which may be referred to as self-apply) when the elements of the clutch are rotating at high speeds.

The hydraulic system 100 also includes the valve body 32, a pump 126, and a sump 128. The sump 128 may be a chamber located at the bottom of the housing 105 where non-pressurized hydraulic fluid is collected via gravity. The hydraulic fluid in the sump 128 may be open to atmospheric pressure. The pump 126 may be configured draw hydraulic fluid from the sump 128, pressurize the hydraulic fluid, and then deliver the pressurized hydraulic fluid to the valve body 32. The valve body 32 may include pressure regulator valves that then adjust the pressure of the hydraulic fluid to a desired value or range. Once the pressure of the hydraulic fluid is adjusted, it may then be delivered to a specific fluid circuit. For example, the valve body 32 may deliver hydraulic fluid to a high-pressure hydraulic fluid circuit 130 through a first pressure regulator valve, a low-pressure hydraulic fluid circuit 132 through a second pressure regulator valve, and intermediate-pressure hydraulic fluid circuit 134 through a third pressure regulator valve.

The high-pressure hydraulic fluid circuit 130 is configured to direct high-pressure hydraulic fluid to the chambers on the apply side of the clutch pistons (e.g., first chamber 110 and second chamber 120) such that the clutch pistons contact the clutch packs (e.g., first clutch pack 108 and second clutch pack 118) in order engage the clutches (e.g., first clutch 102 and second clutch 104). The low-pressure hydraulic fluid circuit 132 is configured to direct low-pressure hydraulic fluid (which is lower than the pressure of the hydraulic fluid in the high-pressure fluid circuit 130 but greater than atmospheric pressure) to components 136 of the transmission that need lubrication (e.g., shafts, gears, bearings, etc.). The intermediate-pressure hydraulic fluid circuit 134 is configured to direct pressurized fluid (which is lower in pressure than the hydraulic fluid in the high-pressure fluid circuit 130 but greater in pressure than the low-pressure hydraulic fluid circuit 132) to the balance dam chambers (e.g., first balance dam chamber 112 and second balance dam chamber 122). The balance dam chambers may be open to the intermediate-pressure hydraulic fluid circuit 134. Alternatively stated, the balance dam chambers (e.g., first balance dam chamber 112 and second balance dam chamber 122) may be considered portions of the intermediate-pressure hydraulic fluid circuit 134.

Valves (not shown) within the valve body 32 may act as switches to connect and disconnect portion of the high-pressure fluid circuit 130 so that each clutch (e.g., first clutch 102 and second clutch 104) may be connected and disconnected independently of the other clutches. The valves within the valve body 32 may be configured to isolate the chambers on the apply side of the clutch pistons (e.g., first chamber 110 and second chamber 120) from the high-pressure fluid circuit 130 when the clutch is disengaged. The chambers on the apply side of the clutch pistons may also be connected to non-pressurized chambers within the housing 105 via outlets. Additional valves (not shown) may be configured to isolate the apply side of the clutch pistons from the outlets to the non-pressurized chambers when the clutch is engaged. The additional valves may be opened when the clutch is disengaged to exhaust the pressurized hydraulic fluid from the apply side of the clutch pistons to the non-pressurized chambers within the housing 105 via outlets. The non-pressurized chamber may be open to atmospheric pressure. The non-pressurized chamber may be the sump 128 or a space within the housing 105 that directs the hydraulic fluid to the sump 128.

The low-pressure hydraulic fluid circuit 132 and the intermediate-pressure hydraulic fluid circuit 134 may also be connected to a non-pressurized chamber (that may be open to atmospheric pressure) within the housing 105. The non-pressurized chamber may be the sump 128 or a space within the housing 105 that directs the hydraulic fluid to the sump 128. A pressure relief valve 138 may be disposed between the intermediate-pressure hydraulic fluid circuit 134 and the non-pressurized chamber.

Figure 4A:
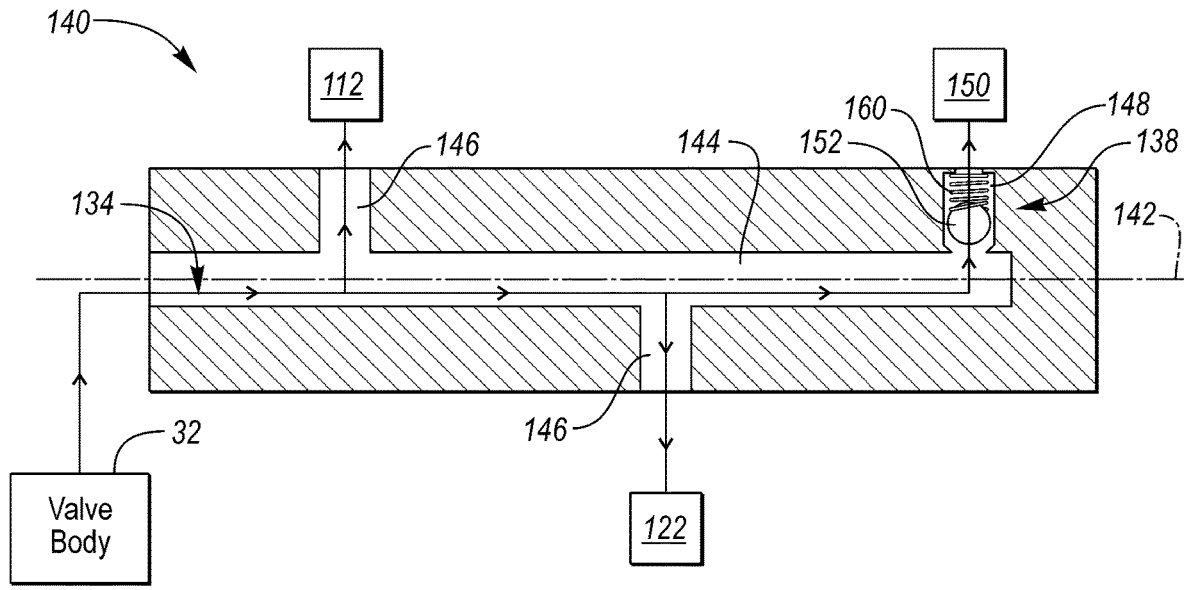
FIG. 4A is a cross-sectional view of a shaft within the transmission taken parallel to the rotational axis of the shaft.
Figure 4B:
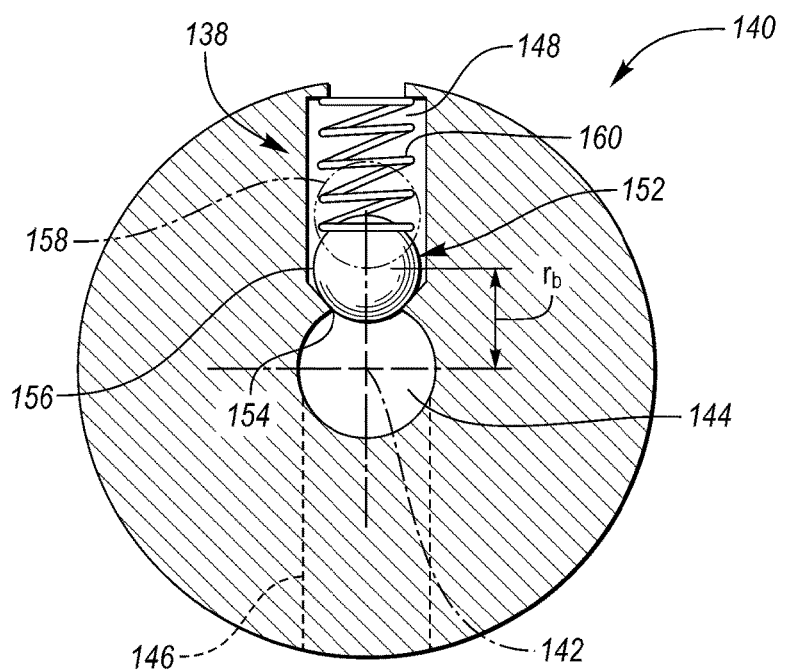
FIG. 4B is a cross-sectional view of the shaft within the transmission taken perpendicular to the rotational axis of the shaft.

Referring now to FIGS. 3, 4A, and 4B, a rotating element or shaft 140 within the transmission 16 may partially define the intermediate-pressure hydraulic fluid circuit 134. The portion of the intermediate-pressure hydraulic fluid circuit 134 that is defined by the shaft may include a bore 144 that extends axially within the shaft 140 (i.e., along a rotational axis 142 of the shaft 140) and a first set of offshoots 146 that establish fluid communication between the bore 144 and the balance dam chambers of the clutches (e.g., first balance dam chamber 112 and second balance dam chamber 122). The shaft 140 may include additional offshoots to establish fluid communication between the bore 144 and additional balance dam chambers of clutches that are not shown in FIG. 4A. The bore 144 may be open to the balance dam chambers of the clutches. The shaft 140 also defines an outlet or outlet channel 148. The outlet channel 148 extends radially outward from the intermediate-pressure hydraulic fluid circuit 134. More specifically, the outlet channel 148 extends radially outward from the bore 144 that partially defines the intermediate-pressure hydraulic fluid circuit 134. The outlet channel 148 is non-pressurized. The outlet channel 148 may also be connected or open to a non-pressurized chamber 150 (that may be open to atmospheric pressure) within the housing 105. The non-pressurized chamber 150 may be the sump 128 or a space within the housing 105 that directs the hydraulic fluid to the sump 128.

The pressure relief valve 138 is disposed within the shaft 140 between the intermediate-pressure hydraulic fluid circuit 134 and the outlet channel 148. More specifically, the pressure relief valve 138 is disposed within the shaft 140 between the bore 144 and the outlet channel 148. The pressures relief value 138 is configured to open when pressure of the hydraulic fluid in the intermediate-pressure hydraulic fluid circuit 134 (or more specifically the bore 144) reaches or exceeds a threshold pressure (assuming the pressure of the non-pressurized chamber is at atmospheric pressure). Alternatively stated, the pressure relief valve 138 may be configured to open when a difference between the pressure of the hydraulic fluid in the intermediate-pressure hydraulic fluid circuit 134 (or more specifically the bore 144) and the pressure in the non-pressurized outlet channel 148 reaches or exceeds a threshold pressure. The pressure relief valve 138 is designed such that the threshold pressure (or threshold pressure differential) required to open the pressure relief valve 138 will decrease as rotational speed of the shaft 140 increases (discussed in further detail below).

When the balance dam chambers of multiple clutches share a common hydraulic feed line and under a scenario where a first of the clutches is engaged and a second of the clutches is engaging, the torque capacity of the of the already engaged clutch may be reduced due to hydraulic fluid being pushed out the balance dam chamber of the oncoming clutch which in turn increases (or spikes) the pressure in the balance dam chamber of the already engage clutch via the common hydraulic feed line. The torque capacity of a clutch is a function of the force acting on the piston of the clutch, which may be represented by equations (1)-(3):

$$F_{piston} = F_{apply} - F_{bal\ dam} - F_{spring} \quad (1)$$

$$F_{apply} = P_{apply} \cdot A_{apply} \quad (2)$$

$$F_{bal\ dam} = P_{bal\ dam} \cdot A_{bal\ dam} \quad (3)$$

where $F_{piston}$ is the force acting on the piston of the clutch, $F_{apply}$ is the force acting on the piston from the hydraulic fluid in the chamber on the apply side of the piston, $F_{bal\ dam}$, is the force acting on the piston from the hydraulic fluid in the balance dam chamber, $F_{spring}$ is the force acting on the piston from the return spring of the clutch, $P_{apply}$ is the pressure of the hydraulic fluid in the chamber on the apply side of the piston (which may be referred to as the apply pressure), $A_{apply}$ is the area of the piston that is in contact with the hydraulic fluid in the chamber on the apply side of the piston, $P_{bal\ dam}$ is the pressure of the hydraulic fluid in the balance dam chamber, and $A_{apply}$ is the area of the piston that is in contact with the hydraulic fluid in the balance dam chamber.

The hydraulic control system of the vehicle 10 may utilize the apply pressure $P_{apply}$ to first determine the force acting on the piston $F_{piston}$ and then to estimate the capacity of the clutch. If there are unknown fluctuations in the hydraulic pressure in balance dam chamber, which may be occur when multiple balance dams share a common hydraulic feed line (as described above), utilizing the apply pressure $P_{apply}$ to estimate the capacity of the clutch may lead to inaccurate control of the clutches within in a transmission which may cause slipping of the clutches when the torque capacity is under estimated.

A pressure relief valve may be utilized to prevent the spike in pressure in the balance dam chamber of an already engaged clutch under the scenario where one clutch is engaged and another clutch is engaging, when both clutches share a common hydraulic feed line. However, a pressure relief valve that is configured to open at a static threshold pressure may be insufficient for a common hydraulic feed line that supplies hydraulic fluid to balance dam chambers of multiple clutches when the common hydraulic feed line (or a portion thereof) is defined within a rotating shaft (e.g., shaft 140 and bore 144). Under such a scenario where a constant fluid pressure is maintained at the supply (e.g., a pressure regulator valve) of the common hydraulic feed line, the pressure of the hydraulic fluid within the portion of the common hydraulic feed line that is located within the rotating shaft (and the pressure of the fluid in the balance dam chambers) will decrease as the rotational speed of the shaft increases. The pressure drop occurs due the centripetal pressure head that must be overcome when the hydraulic fluid enters the rotating shaft. Therefore, it is advantageous to adjust the threshold pressure at which the pressure relief valve opens based on the rotational speed of the shaft, so that the pressure relief valve opens based a current pressure of the system (i.e., the current pressure of the common hydraulic feed line and the balance dam chambers based on the current rotational speed of the shaft) in order to prevent pressure spikes in the balance dam chambers of engaged clutches when a second clutch that shares a common hydraulic feed line is engaged. Stated alternatively, it may be advantageous to decrease the threshold pressure at which the pressure relief valve opens as the rotational speed of the shaft increases, which causes a decrease in pressure of the hydraulic system (i.e., the common hydraulic feed line and the balance dam chambers).

The pressure relief valve 138 is designed and positioned such that the threshold pressure at which the pressure relief valve 138 opens decreases as rotational speed of the shaft increases. The pressure relief valve 138 includes a ball 152 that blocks an opening 154 between the intermediate-pressure hydraulic fluid circuit 134 (or more specifically the bore 144) and the outlet channel 148 when the ball 152 is in a seated position 156. The seated position 156 of the ball 152 establishes a closed position of the pressure relief valve 138. The ball 152 is displaced at a distance radially outward relative to the rotational axis 142 of the shaft 140 when the ball 152 is in the seated position. The ball 152 is configured to move further radially outward, relative to the rotational axis 142 of the shaft 140 and within the outlet channel 148, from the seated position 156 to an unseated position 158 to unblock the opening 154 and to establish an opened position of the pressure relief valve 138. The pressure relief valve 138 also includes a spring 160 that biases the ball 152 toward the seated position 156 and radially towards the rotational axis 142 of the shaft 140.

The force of the ball acting of the spring 160 may be represented by equations (4)-(7):

$$F_{sping} = F_{centrif} + F_{fluid} - F_{weight} \quad (4)$$

$$F_{centrif} = m \cdot \frac{v^2}{r_b} \quad (5)$$

$$F_{fluid} = p \cdot A \quad (6)$$

$$F_{weight} = m \cdot g \quad (7)$$

where $F_{sping}$ is total the external force being applied to the spring 160, $F_{centrif}$ is the centrifugal force of the ball 152 acting on the spring 160, $F_{fluid}$ is the force of the fluid in the intermediate-pressure hydraulic fluid circuit 134 (or more specifically the bore 144) this is acting on the spring 160 via the ball 152, $F_{weight}$ is the force of ball due to gravity that is acting on the spring, m is the mass of the ball 152, v is linear velocity of the ball 152, $r_b$ is the distance that the ball 152 is displaced radially outward relative to the rotational axis 142 of the shaft 140, p is the pressure of the hydraulic fluid in the intermediate-pressure hydraulic fluid circuit 134 (or more specifically the bore 144), A is the area of the ball 152 that is in contact with the hydraulic fluid within the intermediate-pressure hydraulic intermediate-pressure hydraulic fluid circuit 134 (or more specifically the bore 144), which may be the area of the opening 154 between the intermediate-pressure hydraulic fluid circuit 134 (or more specifically the bore 144) and the outlet channel 148, and g is the acceleration of the ball 52 due to gravity.

As the rotational speed of the shaft 140 increases, the ball 152 acts as a fly weight increasing the centrifugal force of the ball 152 acting on the spring 160 and hence decreasing the hydraulic fluid pressure required to open pressure relief valve 138 according to equations (4)-(7). The spring 160 may be preloaded such that the pressure relief valve 138 will not open until the external forces being applied to the spring 160 according to equation (4) exceeds the preloaded force.

In order to prevent pressure fluctuations within the balance dam chambers, the mass of the ball 152 should be rated such that the pressure relief value 138 opens across a range of expected rotational speeds of the shaft 140, at the correlating pressures of the hydraulic fluid within the intermediate-pressure hydraulic fluid circuit 134 (particularly at the bore 144, offshoots 146, and balance dam chambers 112 and 122) associated with the particular rotational speeds of the shaft 140.

Based on data that includes a first rotational speed $\omega_1$ of the shaft, a first hydraulic fluid pressure $p_1$ that occurs while the shaft is rotating as the first rotational speed $\omega_1$, a second rotational speed $\omega_2$ of the shaft, and a second hydraulic fluid pressure $p_2$ that occurs while the shaft is rotating as the second rotational speed $\omega_2$, it is possible to determine a desired mass of the ball 152 that is rated to open the pressure relief valve 138 at a particular hydraulic pressure based on the current speed of the shaft 140.

The force required to be applied to the spring 160 to open the pressure relief valve 138 will remain constant. The pressure values and centrifugal force values applied to the spring, however, will change as the rotational speed of shaft changes. Therefore, by applying equations (4)-(7) to determine spring force at the first rotation speed and pressure values, to determine spring force at the second rotation speed and pressure values, and then setting the first and second spring force values equal to each other, the desired mass of the ball 152 may be determined and then represented by equation (8):

$$m = \frac{(p_1 - p_2) \cdot A}{r_b \cdot (\omega_2^2 - \omega_1^2)} \quad (8)$$

Please note that the first rotational speed $\omega_1$ of the shaft 140 and the second rotational speed $\omega_2$ of the shaft 140 may have been converted to linear speeds of the ball 152 (linear speed being rotational speed multiplied by distance from the rotational axis or $v = \omega \cdot r_b$) when applying equations (4)-(7) and converted back to rotational speeds to arrive at equation (8).

Figure 5:
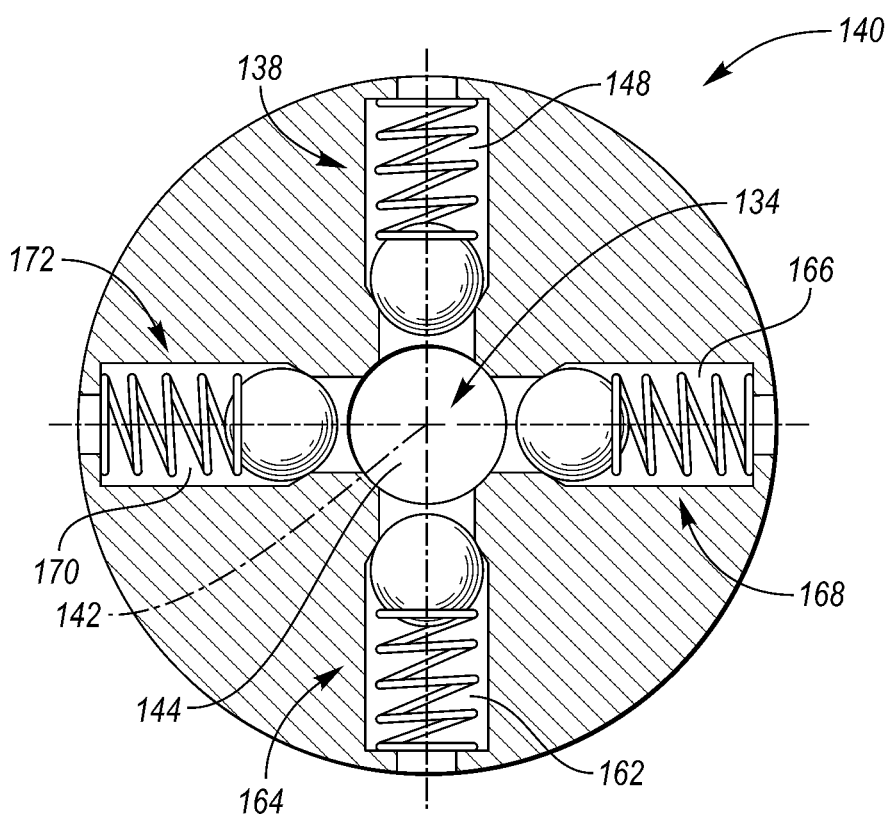
FIG. 5 is a cross-sectional view of an alternative embodiment of the shaft within the transmission taken perpendicular to the rotational axis of the shaft.

Referring to FIG. 5, a cross-sectional view of an alternative embodiment of the shaft 140 is illustrated. The alternative embodiment of the shaft 140 includes additional outlet channels and additional pressure relief valves. The additional outlet channels and pressure relief valves may compensate for exhausting larger flow rates when it is desirable and may help to ensure quick exhaustion of hydraulic fluid to minimize fluctuating pressures within the balance dam chambers and the fluid circuit that feeds the balance dam chambers. The depicted embodiment in FIG. 5 illustrates three additional outlet channels (four total) and three additional pressure relief valves (four total). However, the disclosure should be construed to include a shaft that includes one or more outlet channels and one or more pressure relief valves. The additional outlet channels and pressure relief valves should be construed to include the same functionally and the same sub-components (e.g., ball 152 and spring 160) unless otherwise stated herein. A second outlet channel 162 may extend radially outward from the intermediate-pressure hydraulic fluid circuit 134 (or more specifically the bore 144) opposite the outlet channel 148. A second pressure relief valve 164 is disposed within the second outlet channel 162. Opposing positions of the channels and pressure relief valves may ensure that the balance of the shaft 140 is maintained. A third outlet channel 166, a third pressure relief valve 168, a fourth outlet channel 170, and a fourth pressure relief valve 172 are also depicted at opposing positions relative to each other and at perpendicular positions relative to the first outlet channel 148 and second outlet channel 162. The positioning of the outlet channels and pressure relief valve may be adjusted to positions other than the depicted positions in FIG. 5.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle transmission comprising:
   a plurality of clutches each defining a balance dam chamber;
   a shaft partially defining a pressurized fluid circuit, that includes each chamber, and an outlet; and
   a pressure relief valve disposed within the shaft between the fluid circuit and the outlet and configured to open at a threshold pressure of the fluid circuit, wherein the threshold pressure decreases as rotational speed of the shaft increases.

2. The vehicle transmission of claim 1, wherein the valve includes a ball that blocks an opening between the fluid circuit and the outlet when the ball is in a seated position, wherein the seated position of the ball establishes a closed position of the valve.

3. The vehicle transmission of claim 2, wherein the ball is displaced radially outward relative to a rotational axis of the shaft when the ball is in the seated position.

4. The vehicle transmission of claim 3, wherein the ball is configured to move radially outward relative to the rotational axis of the shaft from the seated position to an unseated position to unblock the opening and establish an opened position of the valve.

5. The vehicle transmission of claim 4, wherein valve includes a spring that biases the ball toward the seated position and radially towards the rotational axis of the shaft.

6. The vehicle transmission of claim 1, wherein a housing of the transmission defines a non-pressurized chamber, and wherein the outlet is open to the non-pressurized chamber.

7. A transmission comprising:
   first and second clutches each defining a balance dam chamber;
   a shaft defining an axially extending pressurized fluid circuit, that is open to each chamber, and an outlet channel extending radially outward from the fluid circuit; and
   a pressure relief valve disposed within the outlet channel and configured to open at a threshold pressure of the fluid circuit, wherein the threshold pressure decreases as rotational speed of the shaft increases.

8. The transmission of claim 7, wherein the valve includes a ball that blocks an opening between the fluid circuit and the outlet channel when the ball is in a seated position, wherein the seated position of the ball establishes a closed position of the valve.

9. The transmission of claim 8, wherein the ball is displaced radially outward relative to a rotational axis of the shaft when the ball is in the seated position.

10. The transmission of claim 9, wherein the ball is configured to move radially outward relative to the rotational axis of the shaft from the seated position to an unseated position to unblock the opening and establish an opened position of the valve.

11. The transmission of claim 10, wherein valve includes a spring that biases the ball toward the seated position and radially towards the rotational axis of the shaft.

12. The transmission of claim 7, wherein a housing of the transmission defines a non-pressurized chamber, and wherein the outlet channel is open to the non-pressurized chamber.

13. The transmission of claim 7, wherein the shaft defines a second outlet channel extending radially outward from the fluid circuit opposite the outlet channel, and further comprising a second pressure relief valve disposed within the second outlet channel and configured to open at a threshold pressure of the fluid circuit that decreases as rotational speed of the shaft increases.

14. A transmission comprising:
   a plurality of clutches each defining a balance dam chamber;
   a rotating element defining a pressurized fluid circuit, that is open to each chamber, and a non-pressurized outlet; and
   a pressure relief valve disposed between the pressurized fluid circuit and the non-pressurized outlet and configured to open at a threshold pressure of the pressurized fluid circuit, wherein the threshold pressure decreases as rotational speed of the rotating element increases.

15. The transmission of claim 14, wherein the valve includes a ball that blocks an opening between the fluid circuit and the non-pressurized outlet when the ball is in a seated position, wherein the seated position of the ball establishes a closed position of the valve.

16. The transmission of claim 15, wherein the ball is displaced radially outward relative to a rotational axis of the rotating element when the ball is in the seated position.

17. The transmission of claim 16, wherein the ball is configured to move radially outward relative to the rotational axis of the rotating element from the seated position to an unseated position to unblock the opening and establish an opened position of the valve.

18. The transmission of claim 17, wherein valve includes a spring that biases the ball toward the seated position and radially towards the rotational axis of the rotating element.

19. The transmission of claim 14, wherein a housing of the transmission defines a non-pressurized chamber, and wherein the non-pressurized outlet is open to the non-pressurized chamber.

20. The transmission of claim 14, wherein the rotating element defines a second non-pressurized outlet opposite the non-pressurized outlet, and further comprising a second pressure relief valve disposed between the pressurized fluid circuit and the second non-pressurized outlet and configured to open at a threshold pressure of the fluid circuit that decreases as rotational speed of the shaft increases.

\* \* \* \* \*